3,732,261
STEROID COMPOUNDS

John R. Smythies, Birmingham, Ala., and Kenneth E. Eakins, London, England, assignors to Nelson Research & Development Company, Irvine, Calif.
No Drawing. Filed Dec. 3, 1971, Ser. No. 204,683
Int. Cl. C07c *169/34*
U.S. Cl. 260—397.4                5 Claims

ABSTRACT OF THE DISCLOSURE

The disclosure describes steroid compounds substituted in the 6 and 15 positions, and in the α-configuration, with —OH, —O and —OA where A is an alkyl group having from one to about seven carbon atoms. The disclosure also describes steroid compounds which contain a highly charged group at the 11 position. These compounds are useful as blockers of prostaglandins or adenosine 3', 5'-monophosphate (cyclic AMP) in humans or animals.

BACKGROUND OF THE INVENTION

The present invention relates to prostaglandin or adenosine 3',5'-monophosphate (cyclic AMP) antagonists and more particularly to steroid compounds which are prostaglandin or cyclic AMP antagonists.

Prostaglandins are a group of unsaturated hydroxy and hydroxyketo long-chain carboxylic acids. These are widely distributed in human and animal tissues and possess a wide variety of physiological and pathological actions. It seems probable that prostaglandins have a biochemical role fundamental to many, perhaps, all animal cells. Many articles have been devoted to the prostaglandins especially the biochemical/pharmacological aspects. A recent review entitled "Hypothesis on Physiological Roles of Prostaglandins" by E. W. Horton, Physiological Review, volume 49, No. 1, January 1969, reviews the present status of the knowledge on the functional significance of the prostaglandins.

Naturally occurring prostaglandins are 20-carbon fatty acids containing a cyclopentane ring. The parent saturated acid has been named prostanoic acid as drawn below:

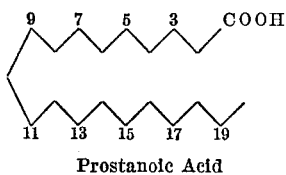

Prostanoic Acid

Four series of natural prostaglandins have so far been described, designated by the letters B, E, F and A corresponding to differences in the ring, as shown below:

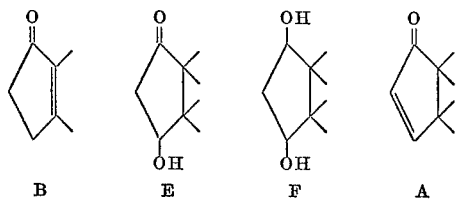

B          E          F          A

All of the prostaglandins have a 15-hydroxyl substituent. The degree of unsaturation of the side chains is indicated by the subscript numeral after the letter; thus prostaglandin $E_1$ has a trans double bond in the 13 position, $E_2$ has, in addition, a cis double bond in the 5 position, $E_3$ has a cis third double bond in the 17 position, etc. The structural formulas of 14 naturally occurring prostaglandins are shown in FIG. 3 of the Horton reference, supra.

Prostaglandins have a wide variety of physiological actions, being active in such diverse areas as fertility, transport of sperm, menstruation, parturation, placental blood flow, gastric secretion, muscle contractility (including vascular smooth muscle, respiratory smooth muscle, gastrointestinal smooth muscle, uteral smooth muscle, and spleenic capsular smooth muscle), development of epiderdmal tissues and central nervous transmitters. Prostaglandins are also thought to affect permeability, e.g., the skin and the eye. Thus, it has been suggested that prostaglandins may act as mediators of various forms of inflammation. This role in inflammation as strongly supported by the involvement of prostaglandins in the inflammatory process in joints, skin and eyes.

For example, in the area of reproduction, control of prostaglandins could lead to direct inhibition or promotion of fertility in either male or female since prostaglandins are normally found in high concentrations in semen and are known to significantly affect smooth muscle of the female reproductive tract. Furthermore, the association of sub-normal prostaglandin levels with infertility in man lends support to the hypothesis that prostaglandins have a role in aiding conception. Thus, specific control of these prostaglandins could lead to a means of changing or regulating male or female fertility or infertility.

Regarding parturation, it is known that amnionic fluid during labor contains a substantially higher amount of prostaglandins than amnionic fluid before the onset of labor. Thus, it is reasonable to conclude that prostaglandins contribute to uterine contractions at parturation. Specific control of these prostaglandins could lead to antiabortive or therapeutic abortive means and be of great value in obstetrics.

Prostaglandins have been identified in the central nervous system and they are known to be released from the brain and spinal cord on nerve stimulation and are normal constituents of cerebrospinal fluid. Horton, supra, indicates (at page 136) that the discovery of a specific prostaglandin antagonist would be of enormous help in settling the questions which have been raised about the role of prostaglandins in the central nervous system.

Certain prostaglandins have been found to be potent vasodilators in most vascular beds and must be considered as possible local mediators of blood flow in view of their widespread distribution in tissues. Furthermore, the identification of a vasodilator prostaglandin in the renal medula infers a role for prostaglandins in the control of systemic vascular tone and as factors in renal regulation of systemic blood pressure.

Prostaglandins have been found in the lungs and have been postulated as related in some way to bronchial asthma. Prostaglandins are present in the stomach and intestine and are released spontaneously from various parts of the gastronintestinal tract. There is evidence that circulating prostaglandins can cause diarrhea.

In view of the foregoing areas in which prostaglandins may be of importance, it is clear that specific control of prostaglandin activity could lead to control over body functions hitherto unattainable.

Adenosine 3',5'-monophosphate (cyclic AMP) is found in most animal cells and his importance in muscle function, in gastric and enzyme secretion, in the central nervous system, in cellular metabolism and in the production and release of hormones. Cyclic AMP is derived from adenose triphosphate (ATP), a key substance in providing energy in the cells by a reaction that is catalyzed by adenyl cyclase. Cyclic AMP has been described as being "hormonal sensitive," that is, when a hormone reaches a cell, the level of cyclic AMP in that cell changes and proceeds to cause the appropriate metabolic or physical response.

It is thought that cyclic AMP and prostaglandins may be interrelated in the physiological mechanisms of the cells. Thus, it has been suggested that prostaglandins act as feedback regulators for cyclic AMP since the prostaglandins act to suppress the accumulation of cyclic AMP. In view of this interrelationship, it is not always clear whether the compounds of the present invention act to specifically block prostaglandins or cyclic AMP at any given instance. It is clear, however, that the steroids of the present invention may be used to modify body physiology and pathology and do so by interfering or blocking the effects of prostaglandins or cyclic AMP in the cell.

Steroids are a general class of substances widely found in nature characterized by the presence of a cyclopentanophenanthrene ring system which may be reduced or otherwise modified. Many steroids are biologically active possessing various specific physiological actions, e.g., hormones. Steroids are numbered as indicated below in Formula 2. In formulas a dotted or broken line is used to denote α-configuration (where the substituent is behind the plane of the ring); a solid line denotes the β configuration (where the substituent is in front of the plane of the ring).

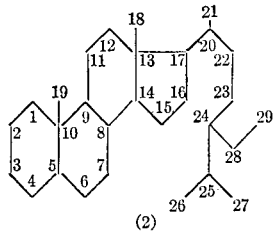

(2)

It has now been discovered that certain defined steroids act to selectively block the actions of prostaglandins or cyclic AMP. This blocking activity may be associated with the abiilty of the steroids of the present invention to interfere or block a portion of the reaction chain involving prostaglandins and cyclic AMP, or result from the blocking of cyclic AMP or prostaglandins. In particular it is theorized that the compounds of the present invention prevent the cyclic AMP from binding in its receptor by repelling the lipophilic cyclic AMP molecule with the charged groups on the compounds of the present invention.

SUMMARY OF THE INVENTION

The present invention relates to a steroid having substituted in the 6 and 15 positions, and in the α-configuration, a member selected from the group consisting of —OH, =O and —OA where A is an alkyl group having from 1 to about 7 carbon atoms.

The present invention also relates to a steroid having substituted in the 11 position a strongly charged group.

The present invention also relates to a method of blocking the actions of prostaglandins or adenosine 3′,5′-monophosphate comprising administering to the site of prostaglandin or adenosine 3′,5′-monophosphate activity an effective amounts of the steroids described above in suitable pharmaceutical carriers.

DESCRIPTION OF THE INVENTION

The present invention comprises a steroid having sitsuted in the 6- and 15-positions, and in the α-configuration, a member of the group consisting of —OH, =O and —OA, wherein A is an alkyl group having from 1 to about 7 carbon atoms, and preferably 1-4 carbon atoms, for example, methyl, ethyl, n-propyl or iso-propyl.

The compound may also be substituted at the 2-position, in either the α- or β-configuration by A, where A is as defined above. Other positions may be substituted by groups appropriate, in steroid hormones, to the position, such as, for example, halogen. The A ring of the steroid may be saturated or it may be unsaturated and have up to 3 double bonds.

More particularly, the present invention relates to a steroid having the following general Formula 3:

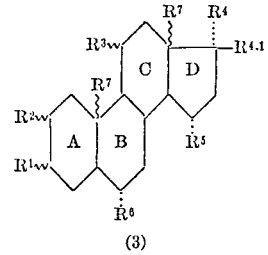

(3)

wherein $R^1$ is —H, —OH, =O, $-O\atop-O\rbrack$ or —OA wherein A is an alkyl group as defined above;
$R^2$ is —H or A wherein A is an alkyl group as defined above;
$R^3$ is —H, —OH, =O, $HPO_4^-$, $HSO_4^-$, $COO^-$, $NH_2$, —$NH^+_3$, an aminoacid substituted at the α position and $NX_3$ where X are alkyl groups having 1–3 carbon atoms;
$R^4$ and $R^{4.1}$ may together be =O or may each be selected from the group consisting of —OH, —H, —COOH, —COA and —CH(OH)A, wherein A is an alkyl group as defined above;
$R^5$ and $R^6$ are each members of the group consisting of —OH, =O and —OA wherein A is an alkyl group as defined above;
$R^7$ is —$CH_3$ or —H; and
the A ring having from 0–3 carbon-carbon double bonds.

Examples of groups of compounds falling within the scope of the invention are compounds of general Formula 4,

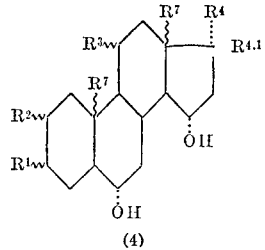

(4)

wherein $R^1$, $R^2$, $R^3$, $R^4$, $R^{4.1}$, and $R^7$ are as defined above.

The hydrogen atoms of the hydroxyl groups in the 6α and 15α positions may both or each be replaced by an alkyl group suitably having not more than 5 carbon atoms.

Examples of the compounds of the invention are

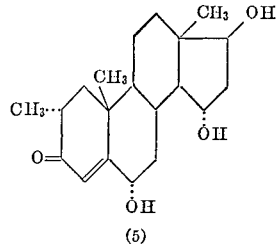

(5)

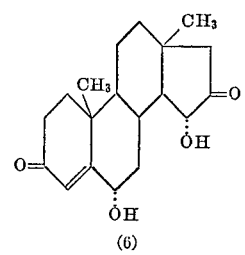

(6)

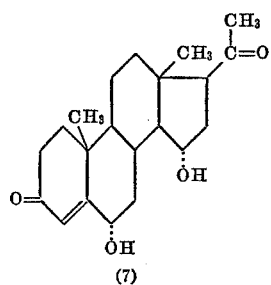

(7)

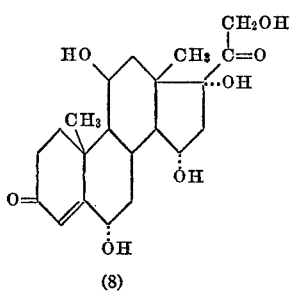

(8)

Substituents containing $R^1$, $R^2$, $R^3$ and $R^4$ may each be either in the α- or β-configuration. The configuration of the $R^{4.1}$ substituent will clearly be opposite to that of $R^4$. $R^5$ and $R^6$ are both in the α-configuration. $R^7$ may be in the α-configuration or β-configuration, although, generally at least one of the two groups is in the α-position, especially if it represents methyl.

Further examples include any estrogen, androgen and progestogen substituted in the 11-position by the stated strongly charged groups.

Representative compounds provided according to the invention include (1) Estradiols with a substituent in the 11-position having the formula

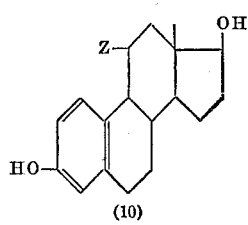

(10)

wherein Z is a strongly charged group as described.

(2) Progestrones with a substituent in the 11-position having the formula

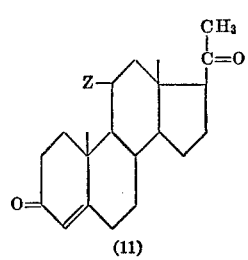

(11)

wherein Z is a strongly charged group as described.

(3) Testosterones with a substituent in the 11-position having the formula

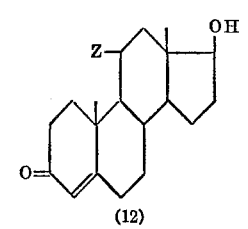

(12)

wherein Z is a strongly charged group as described.

(4) 17α-hydroxy-11-deoxycorticosterone with a substituent in the 11-position having the formula

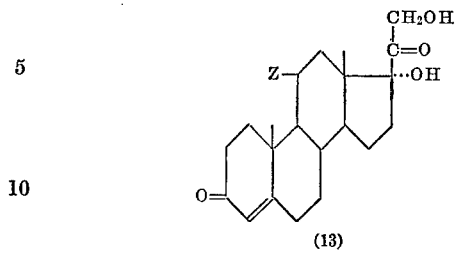

(13)

wherein Z is a strongly charged group as described.

The representative compounds given under (1) and (4) may have the substituents in the 11-position in the α-configuration.

The invention further provides precursors or derivatives of the compounds of the invention resulting from the replacement of one or more hydroxyl groups. Precursors or derivatives of the compounds of the present invention include the phosphates, halogenates, sulfonates, and trifluromethyl derivatives of the compounds. It should be noted that such precursors or derivatives will be converted in the human or other animal to which it is applied to the compound of the invention for which it is a precursor.

The present invention also provides a pharmaceutical composition comprising one or more of the compounds of the invention and a suitable pharmaceutical carrier or diluent. The amount of steroid compound which may be used therapeutically varies with the type of prostaglandin and/or cyclic AMP activity that is blocked, the manner of administration of the blocking agent, i.e., topically, orally or parenterally, or whether the blocking is in vivo or in vitro. Exemplary concentrations of the compounds of the present invention would be from about 0.01 microgram to about 10 milligrams per milliliter.

The method of preparation of the compounds of the invention will depend on the nature of the starting material and on the particular compound to be prepared.

For the insertion of a hydroxl group in the 15-α-position, use may be made of the action of certain bacteria, namely Giberella Baccata and Colletotrichum Antirrhini Helv. Chim Acta, 38, 381 (1955) and 43, 1077, (1960) and United States Pats. Nos. 2,753,290 and 2,879,280 set forth the method by which this insertion may be done. That part of the patents which describe this method is hereby incorporated by reference.

For substituting a compound with a hydroxyl group in the 11-α-position, reference is made to Rec: Trav: Chem: 82,129 (1960) and to United States Pats. Nos. 2,877,162 and 2,602,769 and J. Org.: Chem. 27, 361 (1962). That portion of the patents which describe this method is hereby incorporated by reference.

For substitution of the compound with hydroxyl group in the 6α-position, use may be made of the action of sodium and alcohol which may convert ketonic oxygen to a hydroxyl group or of boron hydride, $B_2H_6$ followed by alkaline hydrogen peroxide which introduces a hydroxide group at the α-position.

For alkylation in the 2-position, use may be made of the action of ethyl oxalate and sodium hydride in benzene to "activate" the 2-position and produce a compound which can be alkylated by, for example, an alkyl iodide, such as, for example, methyl iodide, and potassium carbonate in acetone.

The activating substituent

may be removed by, for example, sodium ethoxide in ethyl alcohol (J. Org. Chem., 21, 1333).

Hydroxyl groups may be blocked by conversion into a hindered ether by the action of an isoolefin such as, for example, isopropene, in the presence of a trace of sulphuric acid. Hydroxyl groups may also be blocked in certain cases (when not hindered) by acetylation with acetic anhydride in the presence of pyridine.

The present invention may be further described and illustrated with reference to the following examples. It is to be understood that the examples are for the purpose of illustration and the invention is not to be regarded as limited to any of the specific compounds or conditions recited therein.

EXAMPLE I

A known compound of Formula 15

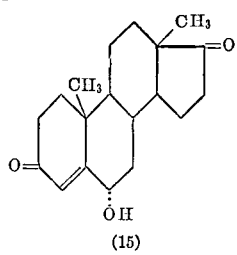

is reduced with sodium borohydride at 0° C. to convert the 17 carbonyl group to a hydroxyl group.

The 2-position is then activated by the action of ethyl oxalate and sodium hydride in benzene, so producing a compound of the Formula 16

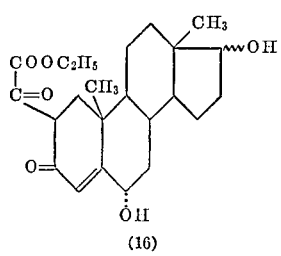

The compound produced is then alkylated in the 2-position by reaction with methyl iodide and potassium carbonate, in acetone. The activating group is then removed by reaction with sodium ethoxide in ethyl alcohol and the 15 hydroxyl group inserted in the ring by bacteria as described above to yield in a compound of Formula 17

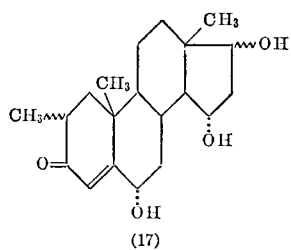

EXAMPLE II

The action of "15α bacteria" on a compound of the Formula 18

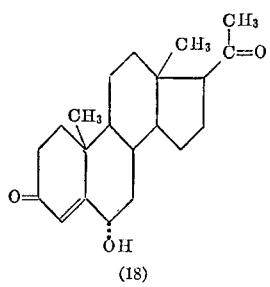

produces a compound of Formula 19

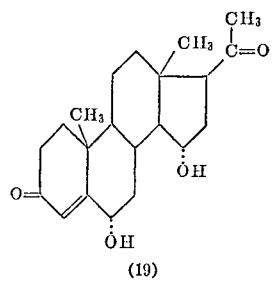

EXAMPLE III

The action of "15α bacteria" on a compound of the Formula 20

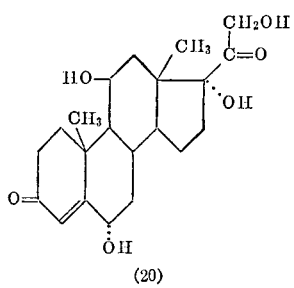

is converted into a compound of the Formula 21

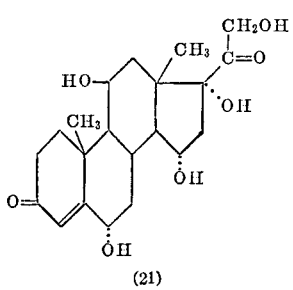

EXAMPLE IV

A compound of the Formula 22

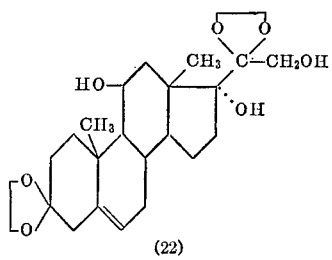

is reacted with boron hydride, $B_2H_6$ followed by alkaline hydrogen peroxide to form a compound of the Formula 23

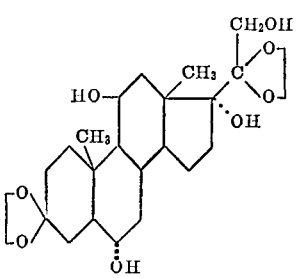

Acid hydrolysis of this compound produces a compound having the Formula 24
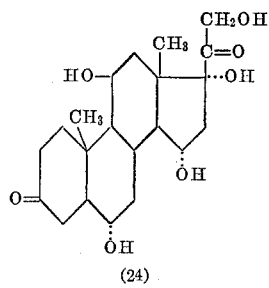
(24)
We claim:
1. A steroid having the formula
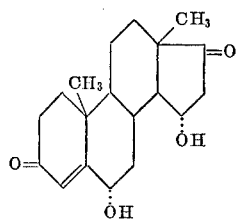
2. A steroid having the formula
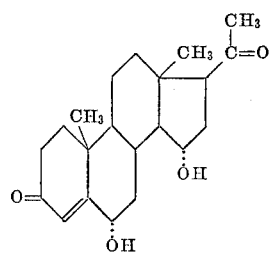
3. A steroid having the formula
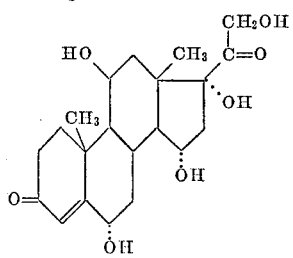
4. A steroid having the formula
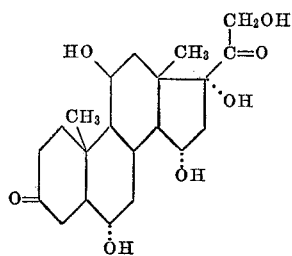
5. A steroid having the formula
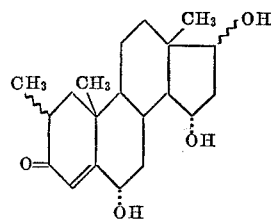
References Cited
UNITED STATES PATENTS
3,214,448   10/1965   Holmlund et al. -- 260—397.45
3,517,036   6/1970    Diassi ------------ 260—397.3
3,623,954   11/1971   Kieslich et al. -------- 195—51
HENRY A. FRENCH, Primary Examiner
U.S. Cl. X.R.
260—239.55 C, 397.1, 397.45, 397.5, 999

PO-1050
(5/69)

UNITED STATES PATENT OFFICE
CERTIFICATE OF CORRECTION

Patent No. 3,732,261          Dated May 8, 1973

Inventor(s) John R. Smythies

It is certified that error appears in the above-identified patent and that said Letters Patent are hereby corrected as shown below:

Column 2, line 61, "his" should read -- has -- .

Column 6, line 37, "10" should read -- 100 -- .

Signed and sealed this 20th day of November 1973.

(SEAL)
Attest:

EDWARD M. FLETCHER, JR.          RENE D. TEGTMEYER
Attesting Officer                 Acting Commissioner of Patents